United States Patent [19]

Sasaki et al.

[11] Patent Number: 5,065,583
[45] Date of Patent: Nov. 19, 1991

[54] METHOD OF STORING VOLATILE SUBSTANCES, CONTAINER FOR STORING SAID SUBSTANCES, AND FLOW-CONTROL METHOD FOR SURFACE FLOW OF SUPERFLUID HELIUM

[75] Inventors: Shosuke Sasaki, Amagasaki; Yasuyuki Kitano, HIroshima, both of Japan

[73] Assignee: Canon Kabushiki Kaisha, Tokyo, Japan

[21] Appl. No.: 480,874

[22] Filed: Feb. 16, 1990

Related U.S. Application Data

[62] Division of Ser. No. 225,177, Jul. 28, 1988, Pat. No. 4,920,753.

[30] Foreign Application Priority Data

Aug. 4, 1987 [JP] Japan .................................. 62-194596
Aug. 20, 1987 [JP] Japan .................................. 62-205156

[51] Int. Cl.$^5$ .............................................. F25B 19/00
[52] U.S. Cl. ........................................ 62/51.3; 62/45.1; 220/454
[58] Field of Search ................. 62/45.1, 51.3; 220/454

[56] References Cited

U.S. PATENT DOCUMENTS 3,892,106 7/1975 Roubeau .................................. 62/45

FOREIGN PATENT DOCUMENTS 2111029 6/1972 France .
147556 6/1931 Switzerland .
1324918 7/1973 United Kingdom .

OTHER PUBLICATIONS

H. Kobayashi, H. Fukuda, T. Tomioka and Y. Kuraoka, "Plastic Dewar for Pressurized Superfluid Helium", 2168 Cryogenics 27 (1987), pp. 316–318.
Bulletin of the American Physical Society, vol. 32, No. 4, (Apr. 1987).
Cryogenics, vol. 26, No. 12 (Dec. 1986).
Russel B. Scott, Cryogenic Engineering, p. 307.

Primary Examiner—Ronald C. Capossela
Attorney, Agent, or Firm—Fitzpatrick, Cella, Harper & Scinto

[57] ABSTRACT

A method of storing voltile substances comprises cooling the substances, and maintaining the saturated vapor pressure of the substances to not higher than normal pressure. A container for storing liquid helium comprises means for blocking a superfluid surface flow of liquid helium where the means is provided on an inner wall or our wall of the container. A method of controlling a surface flow of superfluid helium comprises controlling the surface flow by bringing at least a part of the surface of a structure into a state in which the surface passage is suppressed. The surface flow of superfluid helium is caused on the structure.

31 Claims, 8 Drawing Sheets

FIG.3(A)
FIG.3(B)
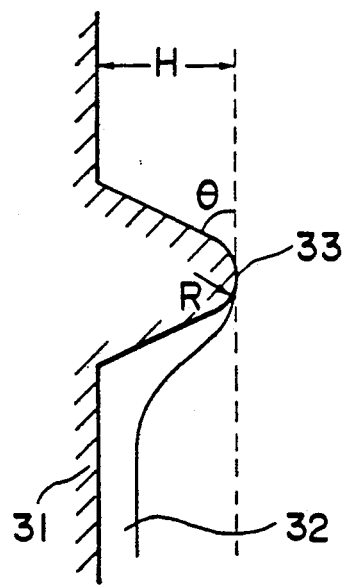
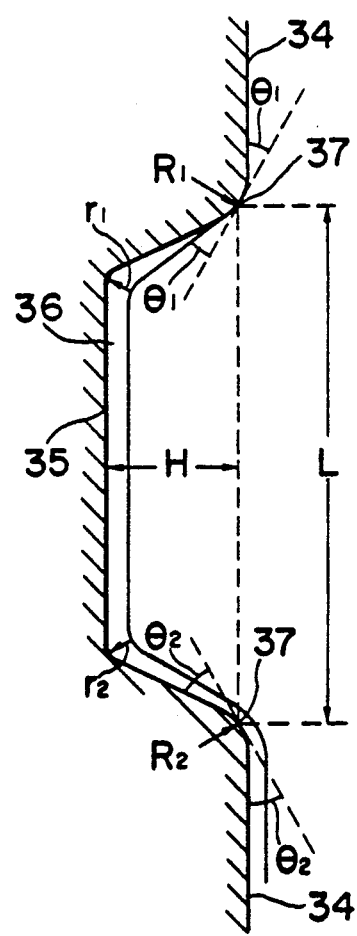

METHOD OF STORING VOLATILE SUBSTANCES, CONTAINER FOR STORING SAID SUBSTANCES, AND FLOW-CONTROL METHOD FOR SURFACE FLOW OF SUPERFLUID HELIUM

This application is a division of application Ser. No. 07/225,177 filed July 28, 1988, now U.S. Pat. No. 4,920,753.

BACKGROUND OF THE INVENTION

1. Field of the Invention

The present invention relates to a method of storing volatile substances. More particularly this invention, when substances that are gaseous at room temperature are stored in a liquid state or a solid state, is concerned with a method of storing volatile substances where a minimum loss of the substances by vaporization can be achieved.

The present invention also relates to a container suited for storing liquid helium.

The present invention further relates to a method of controlling superfluid surface flow of a superfluid liquid upon utilizing the superfluid liquid.

2. Related Background Art

Hitherto, volatile substances have been stored by putting them in closed top containers, stored by putting them in high pressure bombs, or stored by cooling them.

In general, many methods of storing volatile substances that are solid or liquid at room temperature have been known.

However, there is a limit in methods of storing in a liquid or solid state the substances that are gaseous at room temperature.

For example, substances such as liquefied natural gas, liquid air, liquid nitrogen, liquid oxygen, liquid hydrogen and liquid helium have a high saturated vapor pressure at room temperature, so that they are usually stored under pressure or cooling.

Accordingly, to keep these substances in a stable state for a long period of time, great efforts have been made on how the temperature is kept low and also how heat is prevented from coming in.

For storing these substances, commonly used are Dewar vessels or other thermal insulating containers.

Of these substances, greater efforts are made for storing liquid helium.

This is because liquid helium has properties different from general liquefied gases.

More specifically, liquid helium has a very low boiling point under 1 atomospheric pressure, and helium-4($^4$He) liquefies at about 4.2° K. and helium-3($^3$He) liquefies at about 3.2° K. For this reason, it is necessary for storing the liquid helium to use a container made of a thermal insulating material such as metal (e.g., stainless steel) or glass having a low thermal conductivity, and used are containers whose walls are further doubled and inside of the double walls are stored vacuum, which are the so-called Dewar vessels.

Usually, in instances where the Dewar vessels are used, methods are taken such that the inside thereof is made to have a double structure, liquid helium is poured in an inner Dewar vessel, and liquid nitrogen or the like is filled between the inner Dewar vessel and an outer Dewar vessel, thus suppressing the inflow of heat by thermal radiation and conduction.

In the conventional methods as described above, however, it has been unavoidable to suffer a loss due to unnecessary vaporization when the substances that are gaseous under a normal pressure are liquefied or solidified for storing, particularly when they are stored for a long period of time.

Particularly in the case of liquid helium, and taking into account the expense involved, loss due to vaporization is a problem that should be overcome.

Also, when liquid helium is being cooled, it transforms into a peculiar state that it is in a superfluid state below a certain temperature. Helium-4($^4$He) transforms into superfluid state at 2.17° K. or less, and helium-3($^3$He) transforms thereinto at a far lower temperature. Once liquid helium turns to a superfluid state, it loses its viscosity and endlessly extends in the form of a superfluid surface flow along the surface of the container or other structures coming into contact with the liquid helium. This surface flow can not be stopped if, for example, a mouth of the container is simply stoppered or so, and overflows from even a small gap between the stopper and the container without any resistance at all. To stop such a surface flow, the container is required to be hermetically closed in an atomic scale, and the stopping of the surface flow is very difficult if a reusable mechanical sealing means is applied, resulting in an unavoidable loss of liquid helium.

It has been hitherto considered impossible to prevent or control such a superfluid surface flow of liquid helium. For this reason, it only has been practiced within a very limited scope to carry out cooling by utilizing a high thermal conductivity in superfluidity, keeping the liquid helium stable as being cooled to about 1° K., or efficiently transporting liquid helium by utilizing superfluidity.

It has been deemed impossible in theory to limit the surface flow to a particular region in a stable state on the surface of an article coming into contact with superfluid helium, or to control the magnitude or velocity of the surface flow, and thus there has been no choice but to allow it to flow.

SUMMARY OF THE INVENTION

Accordingly, an object of the present invention is to provide a method of storing volatile substances, that can suppress the evaporation of the volatile substances by vaporization to a minimum, and can stably store the volatile substances for a long period of time.

A further object of the present invention is to provide a container suited for storing liquid helium, in particular, among the volatile substances.

Another object of the present invention is to provide a method of controlling the magnitude or flow velocity of a superfluid surface flow of liquid helium, or of limiting the region on which the surface flow is caused.

The present invention provides a method of storing a volatile substance, comprising cooling said volatile substance, and maintaining the saturated vapor pressure of said substance to not higher than normal pressure.

The present invention also provides a container for storing liquid helium, comprising means for blocking a superfluid surface flow of liquid helium, said means being provided on an inner wall or outer wall of said container.

The present invention still also provides a method of controlling a surface flow of superfluid helium, comprising controlling the surface flow by bringing at least a part of the surface of a structure into a state in which the surface flow passage is suppressed, the surface flow of superfluid helium being caused on said structure.

BRIEF DESCRIPTION OF THE DRAWINGS

FIGS. 3A and 3B are views illustrating cross sections of uneven portions illustrated in FIGS. 2A and 2B;

DETAILED DESCRIPTION OF THE PREFERRED EMBODIMENTS

Figure 1:
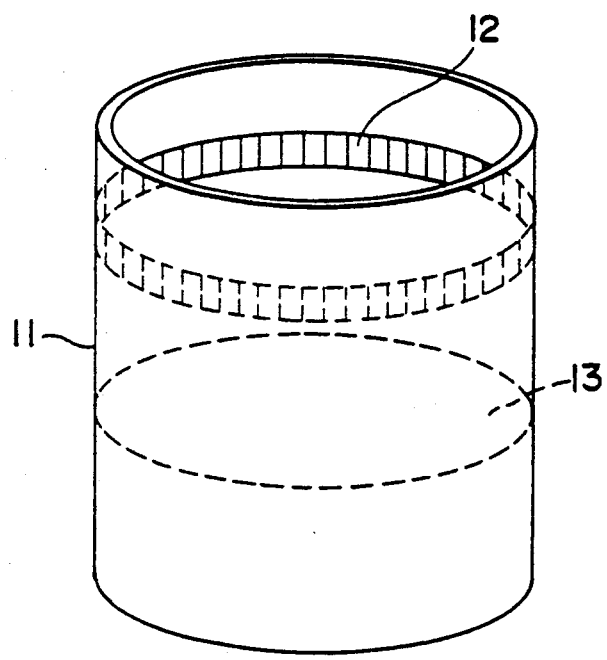
FIG. 1 is a view illustrating the container according to the present invention, whose inner wall is coated with a surface flow blocking material.

Storing volatile substance (particularly liquefied gase) at its boiling point results in the presence of a gas of 1 atmospheric pressure (i.e. 760 Torr) on its liquid surface to cause convection of gas, so that the inflow of heat resulting therefrom becomes unavoidable and the vaporization of the liquefied gas proceeds.

For example, liquid nitrogen boils at 77° K., and has a saturated vapor pressure of 1 atmospheric pressure (i.e., 760 Torr) at that temperature.

Accordingly, storing liquid nitrogen at about 77° K. brings about an abrupt decrease in its quantity owing to vaporization.

Nitrogen has a triple point of about 63° K. When being cooled to this temperature, liquid nitrogen is brought to have a saturated vapor pressure of about 94 Torr. Lowering further its temperature results in solidification of the liquid nitrogen, so that the saturated vapor pressure can be made lower and thus the vaporization of liquid nitrogen can be suppressed.

Also, liquid oxygen is brought to have a saturated vapor pressure of 100 Torr or less at about 75° K., and further lowering its temperature to its triple point (about 54° K.) enables the lowering of its saturated vapor pressure to 0.76 Torr.

With respect to the liquid oxygen in this state, its evaporation due to vaporization is brought lower to a great extent, as compared with liquid nitrogen in other states. The pressure can also be sufficiently reduced, and thus the liquid oxygen is brought to undergo less convection and can be stably stored for a long period of time.

Liquid hydrogen is brought to have a saturated vapor pressure of 100 Torr or less at about 15° K., and further lowering its temperature to its triple point (about 13.8° K.) enables the lowering of its saturated vapor pressure to 52 Torr.

These liquefied gases are solidified with drop of temperature and the resulting solids require a relatively large heat for vaporization, and also cause no troublesome phenomenon such as superfluidity, so that they can be readily stored under reduced pressure.

As above, the loss of volatile substances due to unnecessary vaporization can be suppressed to a minimum by cooling them and also maintaining the saturated vapor pressure thereof to not higher than normal pressure.

In the present invention, it is effective to set the saturated vapor pressure of the volatile substances at 300 Torr or less, preferably 100 Torr or less, and more preferably 50 Torr or less.

On the other hand, in the case of liquid helium, the method described above requires further elaborated measures. Taking into account of the fact that liquid helium does not solidify until the temperature comes to absolute zero unless under pressure and that it is brought into a superfluid state at 2.17° K. or less, showing remarkably different properties from other liquefied gases.

In general, it is necessary for stably storing liquid helium to;

1) suppress the inflow of heat due to the convection of helium vapor;
2) suppress the surface flow of superfluidity;
3) suppress the inflow of heat due to thermal conduction; and
4) suppress the inflow of radiation heat.

In regard to 3) and 4) of the above, various methods have been hitherto employed, one of which is the above double-structured Dewar vessel.

In regard to 1), no measure has been hitherto taken when helium is stored. This is because subjecting liquid helium to reduced pressure has been usually avoided as the evaporation of liquid helium progresses.

It is true that the above reasoning is correct when liquid helium is stored at its temperature of 4.2° K., but the reasoning becomes incorrect if the temperature of liquid helium is further lowered to reach 2.5° K. or less.

Under conditions of such a low temperature, the saturated vapor pressure of liquid helium comes to about 100° Torr, and the inflow of heat owing to the convection of helium vapor is suppressed within this temperature range.

In particular, if liquid helium temperature reaches about 1° to 1.5° K., its saturated vapor pressure comes to be about 0.1° to 1° Torr and the vapor pressure on the liquid surface does not rise any longer, so that the convection of helium vapor becomes almost negligible, also resulting in a great decrease in the evaporation rate.

The above effect becomes particularly remarkable when the saturated vapor pressure of helium is set at 0.1 Torr or less.

However, $^4$He is brought into a superfluid state at 2.17° K. or less. Accordingly, the liquid helium creeps up on the wall of a container to come out of the container. At this time the surface area of the liquid helium greatly increases, resulting in promotion of the evaporation of liquid helium and increasing the amount of lossed helium.

It has been also impossible to carry out cooling under reduced pressure with respect to the liquid helium having been brought into a superfluid state. This is because enlargement of its liquid surface owing to its superfluidity properties makes it necessary to carry out cooling of the liquid helium to 1° K. or less, and it has been impossible to carry out cooling thereof to such a temperature.

Now, in the present invention, means for blocking the superfluid surface flow is provided on the inner wall or outer wall of a container for storing liquid helium, blocking the superfluidity of liquid helium.

Available as the above means is to treat the inner wall or outer wall of the container with use of a material for blocking the superfluid surface flow, or to provide unevenness thereon for blocking the superfluid surface flow.

The material for treating the container to block the superfluid surface flow may include, for example, fluorine-containing material as exemplified by fluorine resins.

For example, very effectively used are a container made of teflon and a container coated on its surface with a fluorine resin. Also usable are those comprising an organic polymer, graphite, glass or the like whose surfaces have been subjected to surface treatment with $CF_4$ plasma or the like.

The surface of a container may also be coated with a surface active agent containing fluorine, or a wax comprised of pentadecafluorocaprylic acid, paraffin or the like.

Also effective for blocking the surface flow is a container comprising polyethylene or other organic polymers formed on its surface in layers, or a container made of polyethylene.

Using such materials, lining may be applied to the inner wall, or outer wall, of a container, or, alternatively, as illustrated in FIG. 1, the above surface flow blocking material may be applied in a stripe to an upper part of the inner wall 12 above helium liquid surface 13, of a container 11.

Such materials are known as materials having water repellency, but it has been hitherto unknown that these materials block the superfluid surface flow.

Figure 2B:
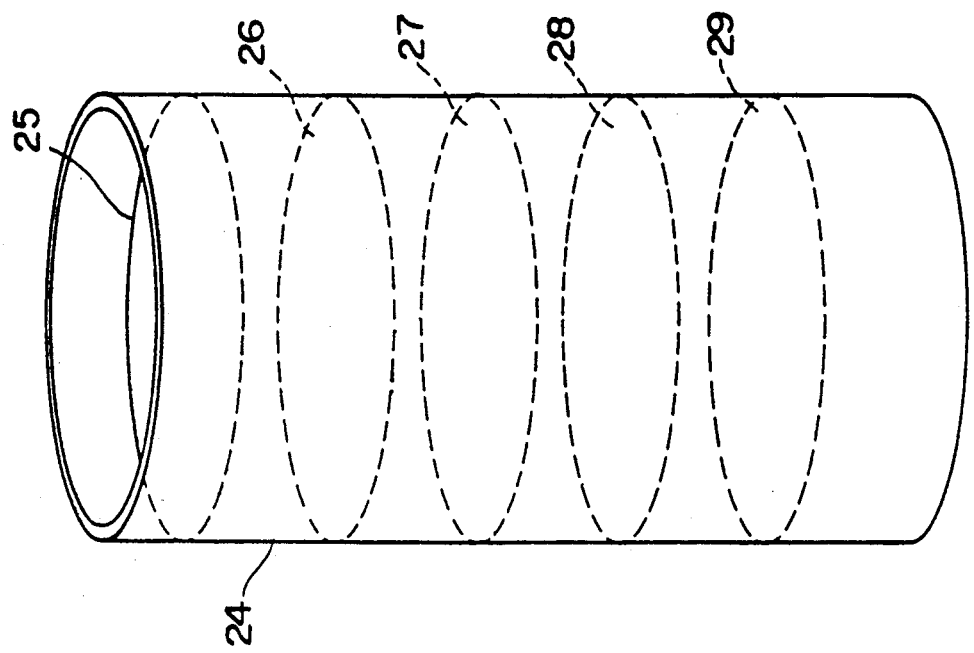
FIGS. 2A and 2B are views illustrating containers according to the present invention, whose inner wall are provided with uneveness.
Figure 2A:
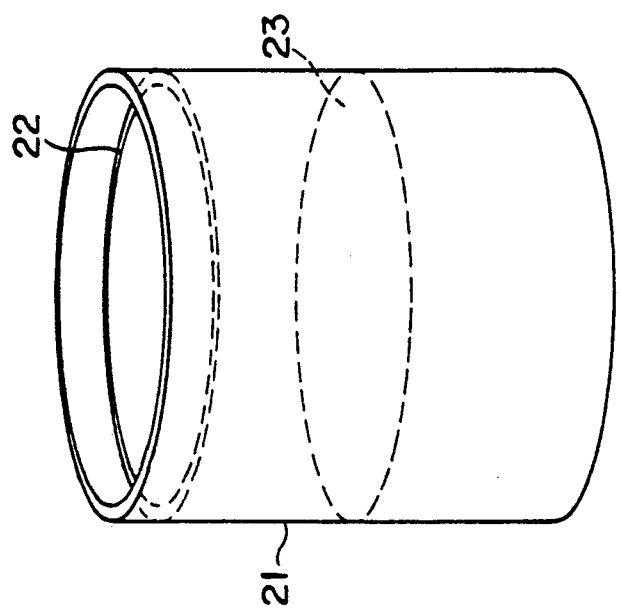

On the other hand, examples of embodiments of the present invention in which unevenness for blocking the superfluid surface flow is provided may include an embodiment in which, as illustrated in FIG. 2A, a streak-like projection or groove 22 having a certain angle in the direction of the flow of the superfluid surface flow is provided on the inner wall or outer wall of a container 21.

FIG. 2B illustrates an embodiment in which a plurality of streak-like projections or grooves 25, 26, 27 and 28 are provided on the inner wall or outer wall of a container 24.

FIG. 3A is a view illustrating a cross-sectional shape of the projection illustrated in FIG. 2. In the figure, R represents curvature radius of the end of a projection 33, and R should be not more than 50 times, preferably not more than 5 times, and more preferably not more than 3 times the thickness of a surface flow 32 in order to block the superfluid surface flow. Since commonly the thickness of the surface flow 32 is considerably thin, R is in the range of 1 $\mu$m or less, preferably 1,000 angstroms or less. The projection may be 1,000 angstroms or more in height so as to be particularly effective for the surface flow blocking.

An angle $\theta$ of the projection 33 illustrated in FIG. 3A may preferably be 30° or more.

FIG. 3B is a view illustrating a cross-sectional structure of a groove for the surface flow blocking.

In FIG. 3B, what substantially contributes the blocking of a surface flow 35 are edge portions 37. The depth H of a groove 35 may preferably be 1,000 angstroms or more; the width of the groove 35, 1,000 angstroms or more; and curvature radiuses $R_1$ and $R_2$, in accordance with the conditions shown in FIG. 3A.

More specifically, in FIG. 3B, $R_1$ and $R_2$ should be not more than 50 times, preferably not more than 5 times, and more preferably not more than 3 times the thickness of the surface flow 36. Since commonly the thickness of the surface flow 36 is considerably thin, $R_1$ and $R_2$ each are desired to be 1 $\mu$m or less, preferably 1,000 angstroms or less. Angles $\theta_1$ and $\theta_2$ of the edge portions 37 each may preferably be 30° or more.

The above unevenness for blocking the surface flow may be formed in plurality on the inner wall or outer wall of the container as illustrated in FIG. 2B, so that there can be exhibited further superior effect.

Eventually, since such projection or groove can not necessarily be formed with ease, it is difficult to form a perfectly defect-free projection or groove. For this reason, the liquid helium climbs over the projection or groove at a defective portion thereof, resulting in no sufficient achievement of the blocking of the superfluid surface flow. The blocking of the surface flow may be hindered also when foreign matters such as dust are adhered on the projection or groove.

Such problems can be solved by providing plurality of projections and/or grooves.

Also, if the quantity of liquid helium in a container decreases to lower the liquid surface level of the liquid helium, there is produced spacing between the liquid surface level and a projection or groove, and the wall surface corresponding to the spacing is covered with superfluid helium. Then, the surface area of the liquid helium is enlarged to increase the amount of evaporation of liquid helium, resulting in increase in the consumption of liquid helium.

However, providing a plurality of projections and/or grooves in the inner wall from the part near to the mouth of the container to the part near to the bottom thereof can bring the surface flow of liquid helium to be blocked at a projection or groove near to the helium liquid surface level, so that the increase in the surface area can be prevented.

As methods for forming the above unevenness (projection or groove), there may be employed, for example, a cutting technique used when a diffraction grating is formed, or a method in which photolithography and etching are combined.

In the manufacture of IC, questioned is the undercut that may occur in etching. In the present invention, however, such undercut may rather be utilized when the projections are formed, so that there can be formed projections being small in R.

The method of the present invention for storing volatile substance is by no means limited to the storing of a small amount of liquid helium in a laboratory. For example, a particularly great effect can be achieved when it is utilized upon cooling of large superconductive coils used in nuclear fusion, electric power storage, etc. by liquid helium. The reason is that, in such a large cooling system, bubbles are formed by vaporization of helium, and the bubbles are brought to stagnate at a particular part of the cooling system, thereby suppressing the cooling at that part, or the formation of bubbles bring about destruction or the like of the system owing to the increase of pressure. If superfluid helium is to be used in such a large scale apparatus, it is possible to carry out cooling with good efficiency by utilizing its high thermal conductivity.

If superfluid helium is utilized in analytical equipments, it is also possible to feed liquid helium to any desired place without using a pump and to make it useful for cooling a specimen. In the case when an inert surface is required to be formed in a vacuum reaction apparatus, it is further possible to form in a vacuum vessel of about $10^{-4}$ Torr the inert surface covered with helium, if the liquid helium is previously cooled until its vapor pressure reaches, for example, $10^{-4}$ Torr or less. Such methods can be utilized in treatment of the inner surfaces of reservoirs for hydrogen atom gas. In the case when a large quantity of liquid helium is transported, the method of the present invention may be applied to liquid helium tanks of tank trucks or tanker boats, so that the loss of liquid helium during transportation can be made very small.

Unnecessary loss of liquid helium can be minimized in traffic facilities utilizing a superconductivity phenomenon, such as linear motor cars utilizing the magnetic float achieved by superconductive coils.

Shown below is an example in which the above described techniques for storing superfluid helium is applied to the flow control of the surface flow of superfluid helium.

Figure 4:
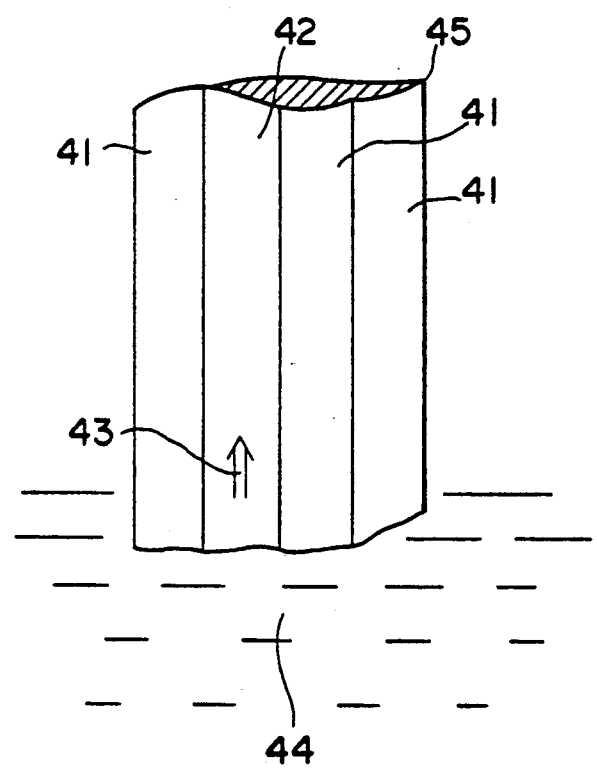
FIG. 4 is a view showing a principle by which the surface flow of superfluid helium is controlled.

As illustrated in FIG. 4, for example, a superfluid helium transporting member 45 comprising fluorine resin coated areas 41 and a fluorine resin non-coated area 42 are dipped in a superfluid helium liquid 44. As a result, a surface flow 43 flows wherein a limited region held between the fluorine resin coated areas, i.e., the fluorine resin non-coated area 42.

Figure 5A:
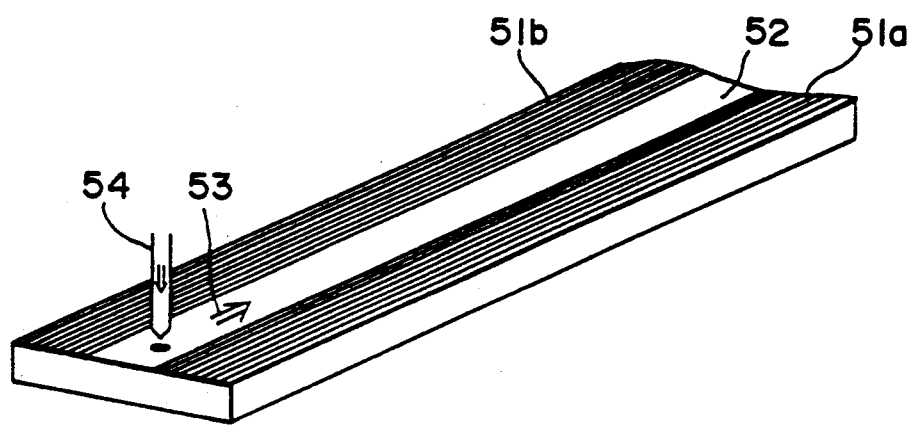
FIGS. 5A and 5B are views illustrating an example of transporting superfluid helium.

The projection as illustrated in FIG. 3A may also be used in the manner, for example, as illustrated in FIG. 5A, so that a surface flow 53 coming from a superfluid helium feeding portion 54 flows wherein a limited region (a superfluid helium transporting area 52) held between two streak-like projections 51a and 51b.

EXAMPLE

The present invention will be described below in more detail with reference to Examples.

Example 1

Figure 6:
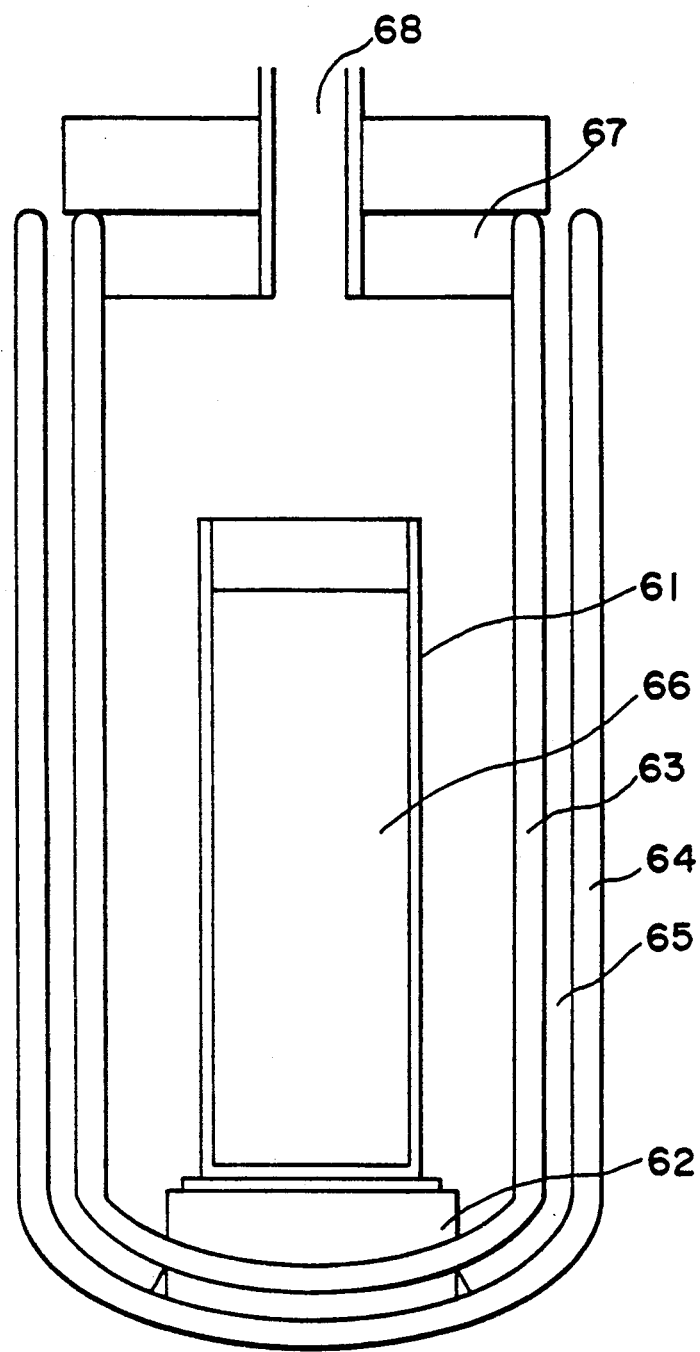
FIG. 6 is a view illustrating an embodiment of the container for storing liquid helium according to the present invention.

As illustrated in FIG. 6, a block 62 made of foamed styrol was placed in double Dewar vessels 63 and 64 for liquid helium, and a measuring cylinder 61 (300 cc) made of teflon was placed thereon.

Liquid nitrogen was introduced into a space 65 between the double Dewar vessels 63 and 64. The inner Dewar vessel 63 thereafter was sufficiently cooled, and then liquid helium was filled in the inner Dewar vessel 63, thereby cooling the inside of the inner Dewar vessel 63.

After the whole was sufficiently cooled, residual liquid helium in the inner Dewar vessel 63 was removed, and liquid helium was poured into the measuring cylinder 61 made of teflon and placed in the inner Dewar vessel 63, which was hermetically closed with a cover. Subsequently, an exhaust vent 68 was connected to a rotary pump and the inside was evacuated so that the inside of the Dewar vessel may come to be about 1 Torr.

Liquid helium 66 was temporarily, vigorously boiled in the course of the evacuation, but became stable when the temperature of the liquid helium was lowered to 2.17° K. Evacuation to 1 Torr brought its temperature to about 1.3° K. While maintaining its pressure to a constant level under these conditions, how the liquid helium decreased was examined. The result revealed that the helium decreased in the proportion of about 6 cc/hr. Even after 15 hours, the liquid helium at 1.3° K. decreased only by 100 cc or so.

When a lead container was used in place of the container made of teflon, the liquid helium decreased at a rate of about 100 cc/hr, showing that it decreased far more rapidly as compared with the case when the container made of teflon was used.

Example 2

Using the same double Dewar vessels as in FIG. 6 except that the block made of foamed styrol and the measuring cylinder were not used and liquid nitrogen was directly poured into the Dewar vessel 63, the inside thereof was evacuated by means of a pump. At this time the temperature of the liquid helium was 55° K. and the liquid nitrogen had been a solid.

Even after the nitrogen was left to be stored under this condition for one month, the weight of solid nitrogen in the Dewar vessel 63 decreased only by 20%.

On the other hand, when it was stored at a temperature of approximately 77° K. without evacuation, the vessel become empty after 3 days.

Example 3

Example 1 was repeated to store liquid helium, except that the measuring cylinder made of teflon was not used and instead paraffin was applied to an upper part of the inner wall of the Dewar vessel, and also the pressure was adjusted to 0.1 Torr.

As a result, the liquid helium decreased by a rate of about 10 cc/hr. On the other hand, when the liquid helium was stored without coating paraffin, it decreased at a rate of about 150 cc/hr.

Example 4

In Example 1, a measuring cylinder made of glass was used in place of that made of teflon.

Streak-like projections were formed by etching at intervals of 5 mm in the peripheral direction of the inner wall surface of the measuring cylinder.

Next, the whole vessel was cooled with use of liquid helium, and liquid helium was further poured into the measuring cylinder, followed by cooling under reduced pressure. Cooling to about 1.3° K. brought the pressure to be lowered to 1 Torr or less. When the liquid helium was stored under these conditions it decreased at a rate of 15 cc/hr.

For comparison, in the case when a measuring cylinder provided with no projection was used, the liquid helium decreased at a rate of 80 cc/hr or more.

Example 5

In the container 61 illustrated in FIG. 6, a superconductive coil of 20 cm in diameter, comprised of Nb-Ti, was placed in the manner such that its lead wire for feeding electric current may extend out of the container.

The space 65 of the double Dewar vessels was filled with liquid nitrogen, and liquid helium was poured into the teflon container receiving the coil, followed by cooling under reduced pressure to lower the temperature of liquid helium to 1.2° K. The saturated vapor pressure at this time was 1 Torr or less.

Next, a persistent current was allowed to flow to the coil, but no heat generation from the coil was seen.

At this time, the liquid helium in the teflon container decreased at a rate of 20 cc/hr. On the other hand, when such cooling under reduced pressure was not carried out, the helium decreased at a rate of 200 cc/hr or more.

Example 6

Figure 5B:
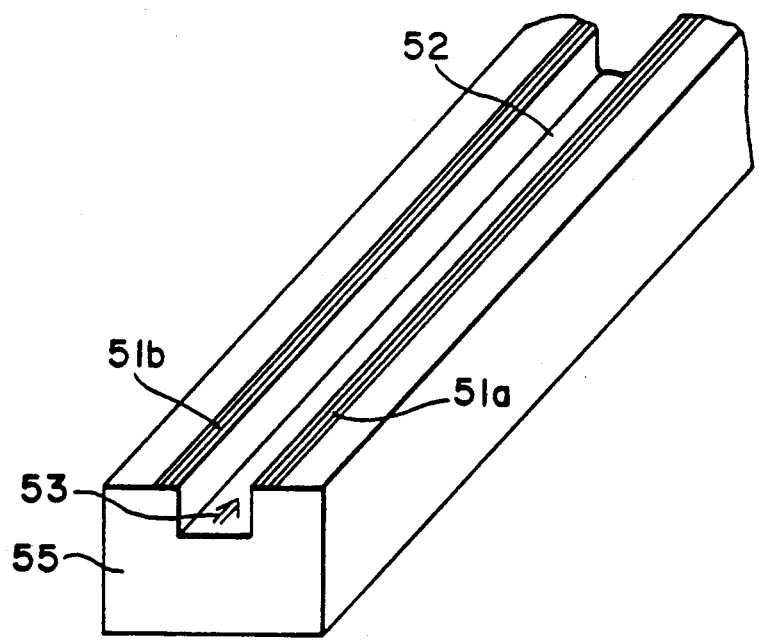

A guide 55 for transportation, as illustrated in FIG. 5B, was used for transporting superfluid helium. It was made of glass. The edges of the guide were provided with grooves 51a and 51b satisfying the requirements of FIG. 3B (i.e., $\theta_1$, $\theta_2=40°$; $L=200$ μm; $H=200$ μm) which were cut in parallel by photolithography. The whole guide was sufficiently cooled to 2.17° K. or less, and thereafter superfluid helium was fed to a liquid helium transporting path 52 formed inside the guide 55. As a result, a surface flow was produced in the direction along the liquid helium transporting path 52 as shown by an arrow 53, whereby the liquid helium could be transported.

Example 7

Figure 7A:
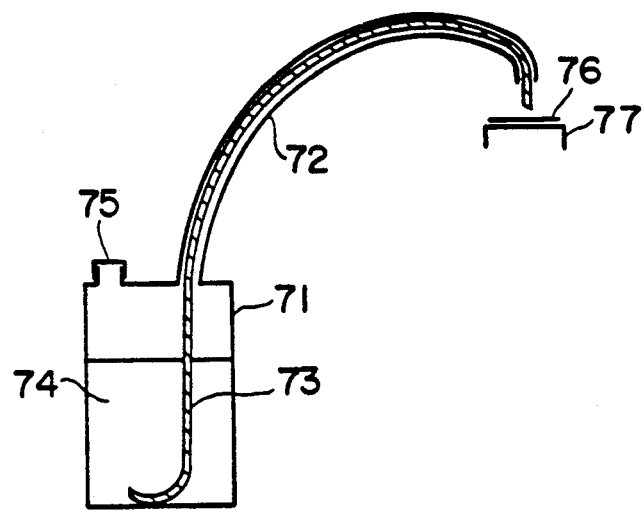
FIGS. 7A and 7B are views illustrating examples in which methods of controlling the flow of superfluid helium are employed.

As illustrated in FIG. 7A, using a tube of 1 mm in diameter, made of polytetrafluoroethylene, prepared was a tube 72 for transporting liquid helium from a liquid helium container 71 in a cryogenic test apparatus 71 to a smaller specimen-cooling system in the apparatus. The container 71 has a volume of 1.5 liters and is made of polytetrafluoroethylene, and the tube 72 is securely fixed to the container 71. This tube 72 is 30 cm long from the container 71 to the specimen cooling system, and the whole apparatus is held in a large Dewar vessel. A twisted wire of about 1 mm in diameter, obtained by bundling and twisting copper wires of 0.05 mm in diameter, is inserted to the tube 72, and this twisted wire 73 made of copper extends from the tube 72 and is immersed in superfluid helium contained in the container 72.

In feeding liquid helium to a specimen 76 on a specimen stand 77 by using the apparatus illustrated in FIG. 7A, the whole was first cooled to 2.17° K. or less, and the twisted wire 73 made of copper was sufficiently immersed in superfluid helium 74. As a result, helium reached the specimen 76 along the surface of the twisted wire 73. That is, the superfluid helium did not spread outside the tube 72 and flowed along only the surface of the twisted wire 73. Namely, this apparatus made it possible to stably feed the superfluid helium from the container 71 to the specimen 76 without using any particular pump.

It was also possible to prevent the superfluid helium from rising up along the inner side of the polytetrafluoroethylene container 71 and from flowing outside from a container cap 75. It was confirmed that since helium ran along only the inside of the tube 72, it had a small surface area, and therefore its vaporization in the course of transportation could be suppressed to a minimum. Also it was confirmed that not only employment of copper in the form of a twisted wire enhanced transport velocity of the liquid helium but also adjustment of the number and diameter of the copper wires constituting the twisted wire enabled adjustment of the helium transport velocity.

Example 8

Figure 7B:
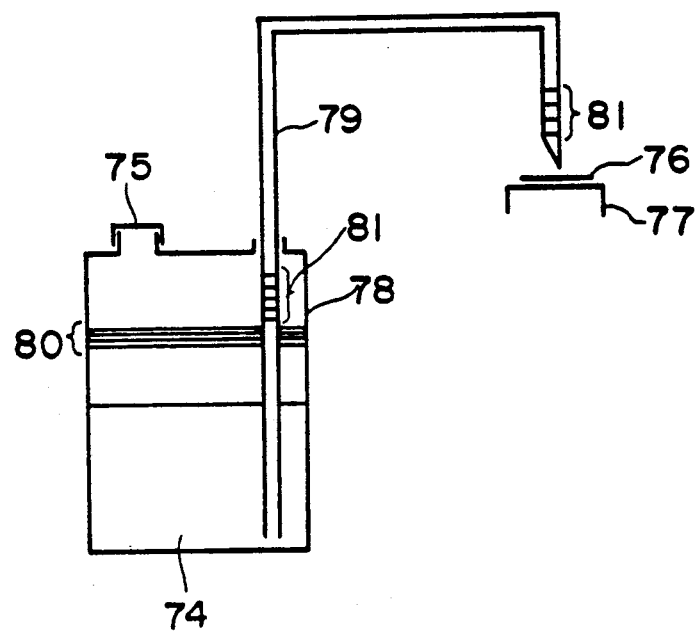

Using nickel, prepared was a superfluid helium container having the same purpose as in Example 7 and used in a cryogenic test apparatus as illustrated in FIG. 7B, and also prepared using a pipe of ⅛ inch made of nickel was a pipe 79 for transporting superfluid helium from this container 78 to a specimen-cooling system in the apparatus. A number of streak-like grooves 80 were cut on the inner wall of the container 78, substantially parallel to the liquid surface to prevent the surface flow of helium from rising up and from overflowing outside the container 78. A number of streak-like grooves 81 were also cut on the outside of the nickel pipe 79 to prevent helium from being transported along the outside of the pipe 79.

According to the method mentioned above, the superfluid helium was transported along only the inside of the nickel pipe 79 without any particular pump, and reached the specimen 76 with only minimum vaporization.

Example 9

Figure 8:
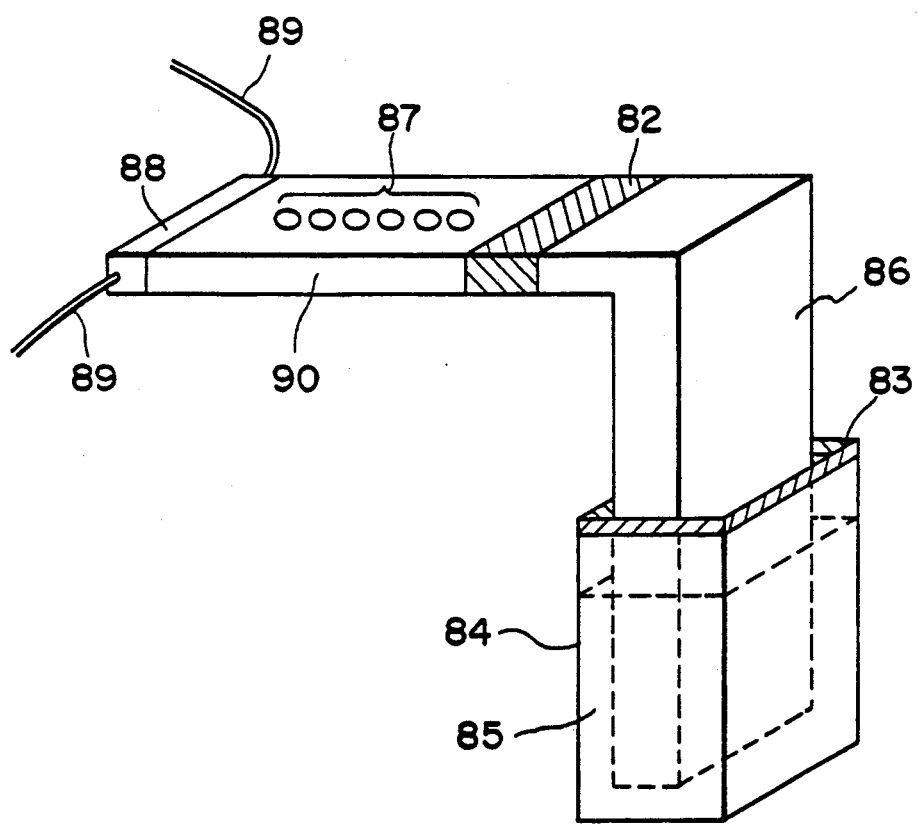
FIG. 8 is a view illustrating an applied example in which the method of controlling the flow of superfluid helium is utilized.

As a specimen stand for imparting a temperature difference on specimens under cryogenic temperature, prepared was one as illustrated in FIG. 8. The specimen stand 90 made of copper was supported by a specimen stand support 86, whose end was immersed in superfluid helium 85. Specimens 87 were arranged on the specimen stand 90. A heater 88 for controlling temperature was fitted to an end portion of the specimen stand 90 so that the stand may be electrically heated. The whole vessel was held in a thermal insulating container. The liquid helium 85 rose up from a helium tank 84 along the specimen stand support 86, reached a polytetrafluoroethylene surface layer 82 provided to block the superfluid surface flow, and stopped there. Then the specimen stand support was cooled at the part adjacent to the layer 82. On the other hand, heating of the specimen stand support by a heater 88 brought heat to be conducted from the heater area toward the specimen stand support 86 to make temperature gradient on the specimen stand 90, so that the temperature difference could be made among the samples 87 arranged thereon. This suppressed the movement of the superfluid helium to the side heated by the heater, thus making it easy to effect heating by the heater and also making it possible to lessen the evaporation of helium, so that consumption of liquid helium could be suppressed to a minimum.

As described above, it has become possible according to the present invention to minimize the loss of volatile substances owing to vaporization.

Also, in the case when the volatile substance is superfluid helium, the present invention can block its surface flow, and therefore the helium decreased at a rate lowered to one-several tenth as compared with the conventional methods.

It further has become possible to control the advance direction or advance velocity of the surface flow by bringing at least a part of the surface of a structure, on which the surface flow of superfluid helium is caused, into a state in which the surface flow passage is suppressed.

We claim:

1. A container for storing liquid helium, comprising: liquid containing means for holding the liquid helium; and
means for blocking the flow of liquid helium, wherein the helium is in a superfluid state in said container and said blocking means is provided on an inner wall surface of said liquid containing means.

2. The container of claim 1, wherein said blocking means includes a material disposed on said inner wall of said liquid containing means for blocking the superfluid flow.

3. The container of claim 2, wherein said material is water repellant.

4. The container of claim 3, wherein said water repellant material is a wax.

5. The container of claim 3, wherein said water repellant material is a fluorine-containing material.

6. A container according to claim 5, wherein said groove has a depth of at least 1000 A.

7. A container according to claim 5, wherein said groove has a width of at least 1000 A.

8. The container of claim 1, wherein said blocking means includes an uneven surface on said inner wall of said liquid containing means for blocking the superfluid flow of helium.

9. A method of controlling a surface flow of superfluid helium, comprising the steps of:
controlling the surface flow of the helium by providing a structure with a flow-suppressing surface; and
directing the surface flow of superfluid helium against the flow-suppressing surface of the structure.

10. The method of claim 9, further comprising the step of treating a surface of the structure with a material capable of suppressing the superfluid surface flow to produce the flow-suppressing surface.

11. The method of claim 10, further using a water repellant material for suppressing the superfluid flow of the helium.

12. The method of claim 11, wherein the water repellant material is a wax.

13. The method of claim 11, wherein the water repellant material is a fluorine-containing material.

14. The method of claim 9, further comprising the step of forming a three-dimensional member on a surface of the structure, with the member being capable of suppressing the surface flow of superfluid helium.

15. The method of claim 14, further providing the three-dimensional member with a projection.

16. The method of claim 14, further providing the three-dimensional member with a groove.

17. A container for storing liquid helium, comprising: a wall portion defining an interior of said container for storing the liquid helium, with said wall portion having a projection disposed thereon, and wherein the liquid helium is in a superfluid state in said container and superfluid surface flow of the liquid helium is interrupted by said projection on said wall portion.

18. A container according to claim 17, wherein said projection has a height of at least 1000 A.

19. A container according to claim 17, wherein said projection has a top portion with a curvature of radius no more than 50 times the thickness of the superfluid surface flow of the liquid helium.

20. A container according to claim 17, wherein said projection has a top portion with a curvature of radius of 1 $\mu$m or less.

21. A container according to claim 17, having a plurality of projections.

22. A method of controlling the flow of a superfluid surface flow of liquid helium, comprising:
suppressing the surface flow of the liquid helium against means for blocking the surface flow;
maintaining the temperature of the liquid helium at 2.17° K. or less;
feeding the liquid helium to a channel sandwiched between the blocking means; and
allowing the surface flow of the liquid helium to pass through the channel.

23. A method according to claim 22, further comprising the step of treating a surface of the structure with a material capable of suppressing the superfluid surface flow.

24. A method according to claim 22, further comprising the step of forming a three-dimensional member on a surface of the structure, with the member being capable of suppressing the surface flow of superfluid helium.

25. A method according to claim 24, wherein the three dimensional member is a groove.

26. A method according to claim 22, wherein the material capable of suppressing the superfluid flow is water repellant.

27. A method according to claim 26, wherein the water repellant material is a wax.

28. A method according to claim 26, wherein the water repellant material is a fluorine-containing material.

29. A method according to claim 22, wherein the three-dimensional member is a projection.

30. A container for storing liquid helium, comprising:
a wall portion defining an interior of said container for storing the liquid helium, with said wall portion having a groove disposed thereon, and wherein the liquid helium is in a superfluid state in said container and superfluid surface flow of the liquid helium is interrupted by said groove on said wall portion.

31. A container according to claim 30, having a plurality of grooves.

* * * * *

UNITED STATES PATENT AND TRADEMARK OFFICE
CERTIFICATE OF CORRECTION

PATENT NO. : 5,065,583

DATED : November 19, 1991

INVENTOR(S) : Shosuke Kitano, et al.

It is certified that error appears in the above-identified patent and that said Letters Patent is hereby corrected as shown below:

[57] ABSTRACT:

Line 7, "our" should read --outer--.

[75] INVENTORS:

"Yasuyuki Kitano, HIroshima," should read --Yasuyuki Kitano, Hiroshima,--.

COLUMN 1:

Line 58, "vacuum," should read --in vacuum,--.

COLUMN 3:

Line 28, "gase)" should read --gas)--.

Signed and Sealed this

Twentieth Day of April, 1993

Attest:

MICHAEL K. KIRK

*Attesting Officer*  *Acting Commissioner of Patents and Trademarks*